(12) United States Patent
Hutchinson

(10) Patent No.: US 8,408,564 B2
(45) Date of Patent: Apr. 2, 2013

(54) REFUSE AND RECYCLING CART

(76) Inventor: Jenny Elizabeth Hutchinson, Southfield, MI (US)

( * ) Notice: Subject to any disclaimer, the term of this patent is extended or adjusted under 35 U.S.C. 154(b) by 326 days.

(21) Appl. No.: 12/941,060

(22) Filed: Nov. 7, 2010

(65) Prior Publication Data

US 2011/0109056 A1    May 12, 2011

Related U.S. Application Data

(60) Provisional application No. 61/259,241, filed on Nov. 9, 2009.

(51) Int. Cl.
*B62B 1/00* (2006.01)
*B62B 3/00* (2006.01)

(52) U.S. Cl. .................. 280/79.2; 280/79.11; 280/79.3; 280/79.5; 280/47.34

(58) Field of Classification Search .................. 280/79.2, 280/79.11, 79.3, 79.5, 79.7, 47.34, 47.35, 280/33.991, 33.997
See application file for complete search history.

(56) References Cited

U.S. PATENT DOCUMENTS

| | | | | |
|---|---|---|---|---|
| 3,341,219 A | * | 9/1967 | Marini et al. | 280/47.19 |
| 3,762,738 A | | 10/1973 | Christina | |
| 3,804,432 A | * | 4/1974 | Lehrman | 280/654 |
| 4,357,029 A | | 11/1982 | Marini | |
| 4,362,309 A | * | 12/1982 | Stamper | 280/47.19 |
| D304,111 S | * | 10/1989 | Mehalick | D34/18 |
| 5,040,808 A | | 8/1991 | McIntyre | |
| D326,174 S | | 5/1992 | McDonald | |
| 5,170,529 A | | 12/1992 | Kovacs | |
| D333,895 S | | 3/1993 | Niemeyer | |
| 5,192,092 A | | 3/1993 | DiBenedetto | |
| 5,820,143 A | * | 10/1998 | Rigo | 280/47.19 |
| 5,845,915 A | * | 12/1998 | Wilson | 280/47.19 |
| D417,054 S | | 11/1999 | Dziengielewski | |
| D422,392 S | | 4/2000 | Weinstein | |
| 6,203,036 B1 | * | 3/2001 | LaVaute et al. | 280/79.3 |
| D447,847 S | * | 9/2001 | Shyshka et al. | D34/21 |
| 6,676,141 B1 | * | 1/2004 | Hadley | 280/47.35 |
| 6,962,353 B1 | * | 11/2005 | Garcia | 280/47.19 |
| 7,168,715 B1 | * | 1/2007 | Friedman | 280/47.35 |
| 7,188,745 B2 | | 3/2007 | Schermel | |
| 7,188,847 B1 | * | 3/2007 | Friedman | 280/47.35 |
| 7,232,136 B2 | * | 6/2007 | Sheehan | 280/47.35 |
| 2006/0245876 A1 | | 11/2006 | Hopkins | |
| 2007/0063467 A1 | | 3/2007 | Hurtgam | |
| 2007/0152411 A1 | | 7/2007 | Lox | |

* cited by examiner

*Primary Examiner* — J. Allen Shriver, II
*Assistant Examiner* — James M Dolak
(74) *Attorney, Agent, or Firm* — Not Just Patents LLC; Wendy S. Peterson

(57) ABSTRACT

A refuse and recycling cart assembly includes a U-shaped lower frame to hold a plurality of refuse or yard waste containers with easy turn lockable wheels to provide for maneuvering the cart in tight places, stopping or storing the cart on inclined and slippery surfaces or immobilizing the cart during loading or unloading. A U-shaped upper frame with a low to the ground wide rear opening provides for easy loading of containers into the cart with little lifting required. A U-shaped rear vertical support frame has a removable upper frame to give even more clearance for loading containers into the cart with little lifting. The top of the upper rear vertical support frame is bent to provide a handle with a user gripping strip placed on the handle. Upper and lower U-shaped horizontal supports are cantilevered from the upper vertical support frame to support a pair of recycling bins.

3 Claims, 2 Drawing Sheets

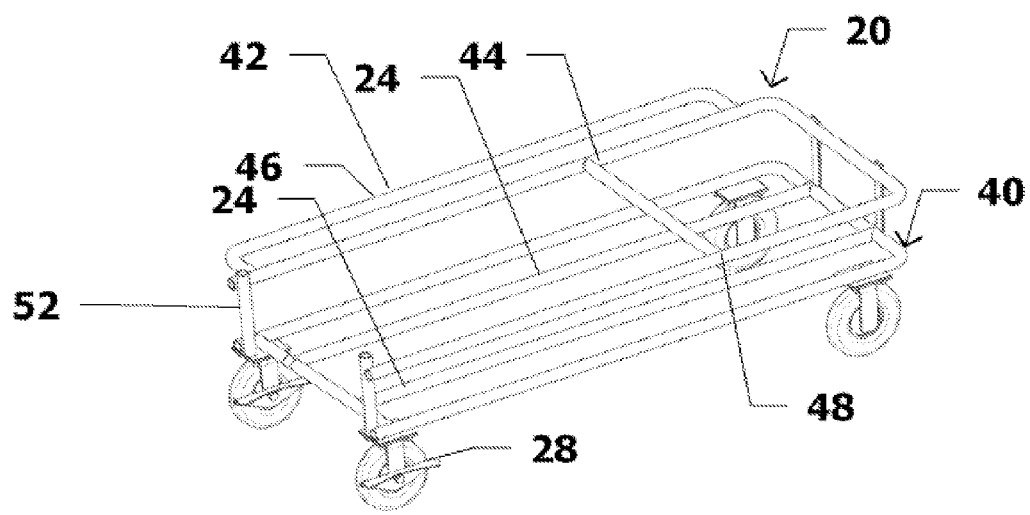

REFUSE AND RECYCLING CART

CROSS-REFERENCE TO RELATED APPLICATIONS

This application claims priority to U.S. Provisional patent application No. 61/259,241 entitled "Refuse and Recycling Cart" filed on Nov. 9, 2009, which provisional application is incorporated herein by reference in its entirety; this application claims the benefit of the provisional's filing date under 35 U.S.C. 119(e).

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The present invention is directed toward a utility cart and more particularly a utility cart adapted for transporting and storing refuse containers, recycling containers and yard waste containers.

Utility carts for residential use have changed little since the first patent was issued by the U.S. Patent and Trademark Office for a device that allows for the transport of a plurality of multi-gallon trash cans in a wheelbarrow-type device to the curbside for collection.

Prior art carts primarily consist of steel construction with two wheels affixed to the frame at the front of the cart, with rigid legs as an extension of the cart frame that provide support during stationary rest. Upward extension of the steel frame at the rear of the trash carts serve as handles in which to grip and maneuver the prior art.

Prior art carts requires that the user bend down, lift and lever the cart and contents, which can range upward of 100 lbs. or more, like a wheel-barrel, and push it to the intended destination. Moreover, the user must be able to manage the weight of the cart and contents during transport to avoid hitting, banging, or scraping the metallic frame legs on grass or pavement.

In addition to aforementioned limitations in design and utility of traditional trash carts for residential use, current carts do not allow for the simultaneous transport and storage of trash containers or yard waste containers, as well as recycling containers. As a growing number of communities around the country adopt recycling programs, it is becoming increasingly necessary that residents haul a number of trash containers and, at minimum, one or two recycling containers to curbside for collection every week. Having easy-to-use transportation for containers encourages users to recycle more, saving landfill space and cost, saving municipality budgets for other uses. Having easy-to-use transportation for containers creates less injurious situations for users where prior art carts required more lifting and difficult maneuvering.

Many communities are switching to standardized containers owned by the local municipalities working with limited budgets where having residents dragging or half-wheeling the containers on the ground can reduce the life of these containers and cause injuries to the users. Keeping these containers out of contact with the ground maximizes the life of the containers.

It is the objective of this present invention to provide a design for a modern refuse and recycling cart that allows for the ergonomically dual transport and storage of a plurality of multi-gallon trash containers and/or yard waste containers and two medium-large recycling bins to curbside for collections.

BRIEF SUMMARY OF THE INVENTION

The refuse and recycling cart supports its own weight and the weight of the containers being transported during storage and transporting containers making it easy-to-use and causing fewer injuries to users and fewer injuries to items stored close to the carts (like cars) from lifting and maneuvering containers into the cart and maneuvering the cart itself. This is an advantage over the prior art carts that have two wheel designs that are heavy or difficult to maneuver during use.

The refuse and recycling cart also provides locking wheels and all-wheel turning which allows users to store and retrieve the cart from tight places and to load the cart without the cart rolling into other items stored close to the cart and to allow the users to stop and securely rest the cart on inclined surfaces like driveways or sidewalks.

The refuse and recycling cart also provides a low lift over and low lift-up for the user to place containers onto the lower frame by providing an open access to the inside of the cart when the upper section of the rear vertical assembly is temporarily removed and the divider crossbar temporarily lifted out of the way. This allows for users to place items in the cart with very little lifting involved. An optional solid floor allows users to slide wheeled containers or containers without smooth bottoms along the lower frame into the cart without catching the container bottom or wheels on the lower frame and allows filling the cart with very little lifting involved.

The refuse and recycling cart also provides a user gripping strip on the handle that allows for easy maneuvering even in inclement weather where hot, cold or wet weather conditions make prior art handles painful to touch or hard to hang onto.

The refuse and recycling cart holds multiple containers at one time whether it be refuse containers, yard waste containers and recycling containers both for storage and for transportation to the curb or other pick-up point. This eliminates the multiple trips required by less versatile prior art carts and encourages more recycling. A lid holding support on the present invention holds lids when not in use, decreasing clutter and helping to assure the lids are easy to find and easy to put back into use as opposed to prior art carts that make no accommodation for multiple types of containers or lids.

BRIEF DESCRIPTION OF THE SEVERAL VIEWS OF THE DRAWING

FIG. 3 is a perspective view of the U-shaped lower frame assembly and the U-shaped upper frame assembly.

DETAILED DESCRIPTION OF THE INVENTION

Figure 1:
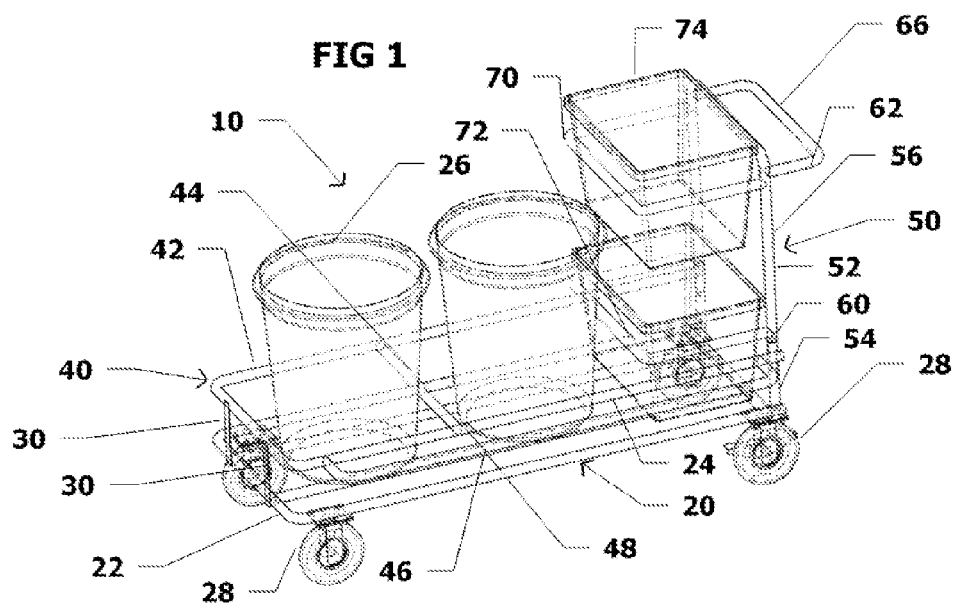
FIG. 1 is a perspective view of an assembled invention.
Figure 2:
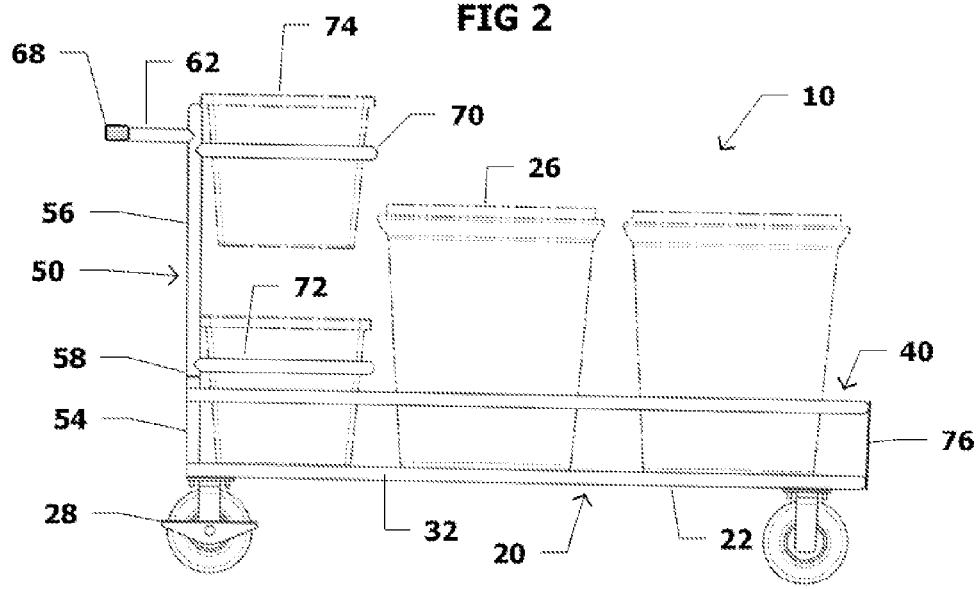
FIG. 2 is a side elevation view of an assembled invention with the cart on a slight incline and two rear wheels locked.

Referring now to the drawings in detail wherein like reference numerals have been used throughout FIGS. 1-3 to designate like elements, there is shown in FIG. 1, a refuse and recycling cart assembly 10, fully assembled.

Referring to FIG. 1-3, a U-shaped lower frame assembly 20 includes a U-shaped lower frame 22 with a plurality of horizontal cross supports members 24 supporting the lower frame 22 (FIG. 3) and supporting a plurality of refuse or yard waste containers 26 (dotted lines in FIG. 1 and FIG. 2) when in use. The lower frame 22 is vertically supported by a plurality of lockable wheels 28 that support the weight of the assembly 10 and its containers 26 during storage and use, provide easy maneuvering in tight spaces, and allow resting of the assembly 10 on inclined or slippery surfaces or immobility of the assembly 10 during loading of the containers 26. A plurality of vertical support legs 30 rise from the lower frame 22 to support a U-shaped upper frame assembly 40 and to provide vertical support for an identification plate 76 (FIG. 2). An optional solid floor 32 (FIG. 2) provides for containers 26 with uneven bottoms or big wheels to be slid or rolled along the lower frame 22 when the horizontal cross member/dividing member 44 is optionally pivotally attached and raised while the containers 26 are being moved with the upper vertical support assembly 50 removed to leave a wide opening and low lift-up for containers 26. FIG. 3 shows the lower frame assembly 20 and the upper frame assembly 40 wide opening at the rear of the assembly 52 illustrating the low lift-up. The lower frame 22, the plurality of lockable wheels 28, the plurality of vertical support legs 30, and the plurality of horizontal cross support members 24 are all attached by attachment means well known in the art and made of materials well-known in the art such as various metals or plastics.

Referring to FIG. 3, a U-shaped upper frame assembly 40 includes an upper frame 42, a horizontal cross support/dividing member 44, and a lid holding U-shaped frame 46 that holds a plurality of lids when the lids are not in use. This lid-holding frame keeps lids from being lost or misplaced in awkward places (like under the cart) when the lids are not in use. The horizontal cross member/dividing member 44 is fixed on both sides or optionally pivotally attached at one side of a mid section of the upper frame 48. The upper frame 42, the horizontal cross support/dividing member 44, the lid holding U-shaped frame 46 and the vertical support legs 30 are all attached by attachment means well known in the art and made of materials well known in the art such as various metals or plastics.

Referring to FIG. 1-3, a U-shaped vertical support assembly 50 vertically supports a rear of the assembly 52 and includes a pair of lower vertical support frames 54 and an upper vertical support frame 56. A pair of male to female connection/insertion points 58 connect the upper vertical support frame 56 to the lower vertical support frames 54. A pair of locking mechanisms 60 holds the upper vertical support frame 56 to the lower vertical support frame 54 at the insertion point 58. At the top 62 of the upper vertical support frame 56 is a horizontal handle 66. A user gripping strip 68 (FIG. 2) on the handle 66 provides an easy grasping area for the user for easy maneuvering of the cart even in inclement weather when hot, cold or wet weather would make a prior art handle painful to touch or difficult to hang onto. An upper 70 and a lower 72 U-shaped horizontal support is cantilevered from the upper vertical support frame 56 to provide vertical support for a pair of recycling bins 74 (dotted lines in FIG. 2). The lower vertical support frames 54, the upper vertical support frame 56, the user gripping strip 68 and the lower 72 and upper 70 horizontal cantilevered supports are all attached by attachment means well-known in the art and made of materials well-known in the art such as various metals and plastics.

Each insertion point 58 uses a lockable mechanism 60 well known in the art to temporarily lock the lower vertical support frames 54 to the upper vertical support frames 56. The removable upper support frame 56 allows a user open up the rear of the assembly 52 leaving a wide opening in order for the user to be able to easily access the inside of the cart and put containers 26 in with little heavy lifting.

What is claimed is:

1. A refuse and recycling cart assembly comprising:
   a U-shaped lower frame assembly comprising
      a lower frame to vertically support cross support members and provide stability to the structure;
      a plurality of lockable wheels that vertically support the lower frame, support a weight of the cart assembly and a plurality of refuse and yard waste containers during storage and use, provide maneuvering in tight spaces, allow resting of the cart assembly on inclined or slippery and uneven surfaces and allow immobility of the cart assembly during loading of the containers;
      a plurality of cross supports members horizontally supporting the lower frame and supporting the plurality of refuse and yard waste containers when in use;
      a plurality of vertical support legs rising from the lower frame to vertically support the structure;
   a U-shaped upper frame assembly comprising
      an upper frame;
      a horizontal cross support/dividing member;
      a lid holding U-shaped frame for holding a plurality of refuse and yard waste container lids when the refuse and yard waste containers are not being transported or the lids are not otherwise in use;
   a U-shaped vertical support assembly vertically supports a rear of the cart assembly and comprises
      a pair of lower vertical support frames;
      an upper vertical support frame;
      a pair of male to female connection/insertion points connecting the upper vertical support frame to the lower vertical support frames;
      a pair of locking mechanisms to lock the upper vertical support frames to the lower vertical support frames;
      a bend at a top of the upper vertical support frame for a horizontal handle to provide for maneuvering of the cart;
      a user gripping strip on the horizontal handle that allows for gripping the handle and maneuvering even in inclement weather where hot, cold or wet weather conditions make a bare handle difficult to use; and
      an upper and a lower U-shaped horizontal support cantilevered from the upper vertical support frame to provide vertical support for a pair of recycling bins.

2. The refuse and recycling cart of claim 1 wherein a floor is placed on the horizontal cross member supports to allow refuse and yard waste containers to be moved along the floor during loading and unloading and wherein the horizontal cross support/dividing member is pivotally attached to one side of the upper frame in order for the horizontal cross support/dividing member to be pivoted out of the way while refuse and yard waste containers are wheeled or pushed on the floor during loading for storage or transportation purposes.

3. The refuse and recycling cart of claim 1 wherein a vertical support leg provides vertical support for an identification plate.

* * * * *